Patented Sept. 21, 1926.

1,600,547

UNITED STATES PATENT OFFICE.

HENRY JOHNSEN, OF NOTODDEN, NORWAY, ASSIGNOR TO NORSK HYDRO ELEKTRISK KVAELSTOFAKTIESELSKAB, OF OSLO, NORWAY.

PROCESS FOR THE CONCENTRATION OF DILUTED NITROUS GASES.

No Drawing. Application filed May 6, 1925, Serial No. 28,522, and in Norway May 15, 1924.

As is known, the gases which are produced in electric furnaces by oxidation of the nitrogen of the air, contain 1–2 vol. per cent of nitrogen oxides and those that are produced by the oxidation of ammonia contain 8–10 vol. per cent, whilst the nitrous gases arising from denitrating processes contain variable quantities of nitrogen oxides. Most of these gases can without difficulty be absorbed to nitric acid in water. There will, however, be a remainder of gas which only by means of an excessively large tower space can be absorbed in water. The remaining gas has therefore to be absorbed by means of alkaline absorbents such as soda, whereby the gases may be returned at a lower stage of oxidation than is possible with water, and the absorption can therefore take place in a comparatively small tower space. It does not pay, however, to use soda as a means of absorption when it is not nitrite that is being manufactured, wherefore several propositions have been put forward for the regeneration of the soda that has been used.

The present invention has for its object a method whereby the use of soda is avoided and whereby the nitrous gases after having been absorbed are released from their absorbent and returned in such a state of concentration to the tower or equivalent that they can be absorbed in water without difficulty.

The process consists in using, as an absorbent, a solution of alkali metal phosphate. It has been discovered that a solution of alkali metal phosphate absorbs just as well as a solution of soda. If, for instance, a solution of tri-sodium phosphate is used, nitrous gases can be absorbed without difficulty until a solution is obtained that consists of 2 mol. of sodium nitrate or nitrite nitrate and 1 mol. of mono sodium phosphate. In acid proof apparatus it is even possible to effect the absorption to such an extent that a part of the monoalkali metal phosphate can be utilized.

When the absorption is ended the absorption liquid is first reconcentrated by evaporation and later on it is heated to such a temperature that the nitrite and nitrate respectively is decomposed by the acid phosphates. This can, for instance, take place in a current of hot nitrous gases, tri-sodium phosphate is then formed again whilst the nitrous gases escape together with the heating gases. The sodium phosphate is dissolved in water and is used again for absorption.

The following may be given as an example of how the process may be performed:

A saturated solution of sodium phosphate is used, in the usual way and in towers of well-known construction, for absorbing the remainder of the nitrous gases. The absorption is regulated in such a way that the concentration of the hydrogen ions in the absorption liquid is not allowed to exceed a definite $P_H$ (for instance 7).

At the beginning the salt concentration in the liquid will not be very great on account of the solubility of the sodium phosphate (20 gr. $Na_3PO_4$ in 100 grammes of water at 30° C.) but gradually, as besides sodium nitrite, mono- and di-sodium phosphate are formed by the absorption, new quantities of tri-sodium phosphate are added to the original solution until a volume of nitrous gases equivalent to 1 ton of $HNO_3$ is absorbed in about 6 tons of water.

After neutralization with tri-sodium phosphate this solution is evaporated in the usual way to a concentration of about 47 per cent, solid matter. This concentrated solution or sludge is conducted to a decomposing apparatus, in which the finely separated salt solution meets a current of the hot gases. These can be obtained from light arc furnaces, if such furnaces are being employed, but they can also be obtained from other sources, for instance, from any other furnace. The salt mixture is thereby heated instantaneously to about 600° C. whereby tri-sodium phosphate is formed separating the nitrous gases, which then, by the well-known method, are cooled and absorbed in water.

In the above example the use of tri-sodium phosphate is mentioned. There is, however, no reason why di-sodium phosphate should not also be used, just as well as the corresponding potassium salts may be used.

As mentioned above the decomposition of the nitrite or nitrate respectively can be most adequately effected by atomizing the salt mixture, which is obtained by the evaporation, into or in a chamber through which nitrous gases, or other gases of a sufficiently high temperature, pass. The atomizing or spraying can be effected with the concentrated solution or the salt mixture can be melted in a closed chamber and caused to flow therein down onto a quickly rotating disc or by it being blown with compressed air, or by some other well-known method.

The decomposition process can also be effected in a closed chamber by conducting the salt mixture through a rotating cylinder or a shelf apparatus with mechanical transport contrivance, which is pervaded by hot gases. The heating can also take place in closed containers. In this case the escaping gases will consist of nitrogen oxides, which can therefore, by cooling with water of about 15–20° C. be condensed into a liquid state.

Claims.

1. Process for the concentration of nitrous gases consisting in absorbing the gases in a solution of alkali metal phosphate and heating the resulting mixture in a closed chamber to such a degree that the nitrogen is separated in the form of nitrous gases, alkali metal phosphate being reformed at the same time.

2. Process for the concentration of nitrous gases consisting in absorbing the gases in a solution of alkali metal phosphate, and atomizing the resulting liquid in a chamber through which a current of hot gas is passed.

3. Process for the concentration of nitrous gases consisting in absorbing the gases in a solution of alkali metal phosphate, evaporating the resulting liquid and atomizing it in an enclosed current of hot gas.

4. Process for the concentration of nitrous gases consisting in absorbing the gases in a solution of alkali metal phosphate, evaporating it to dryness by atomizing it in a current of hot gas and collecting the fumes thus obtained.

5. Process for the concentration of nitrous gases consisting in absorbing the gases in a solution of alkali metal phosphate and heating the resulting mixture in closed containers to such a degree, that the nitrogen is separated in the form of nitrous gases, alkali metal phosphate being reformed at the same time.

6. Process for the concentration of nitrous gases, consisting in absorbing such gases in a solution of an alkali metal phosphate, decomposing the resulting salt solution in a current of hot gas from a nitrogen furnace, thereby re-forming the alkali metal phosphate and causing the commingled gases to pass to absorption tower for absorption by water therein.

In testimony that I claim the foregoing as my invention, I have signed my name.

HENRY JOHNSEN.